No. 879,393. PATENTED FEB. 18, 1908.
O. E. LEVILLY.
EXPANSION REGULATOR FOR REFRIGERATING MACHINES.
APPLICATION FILED FEB. 5, 1907.
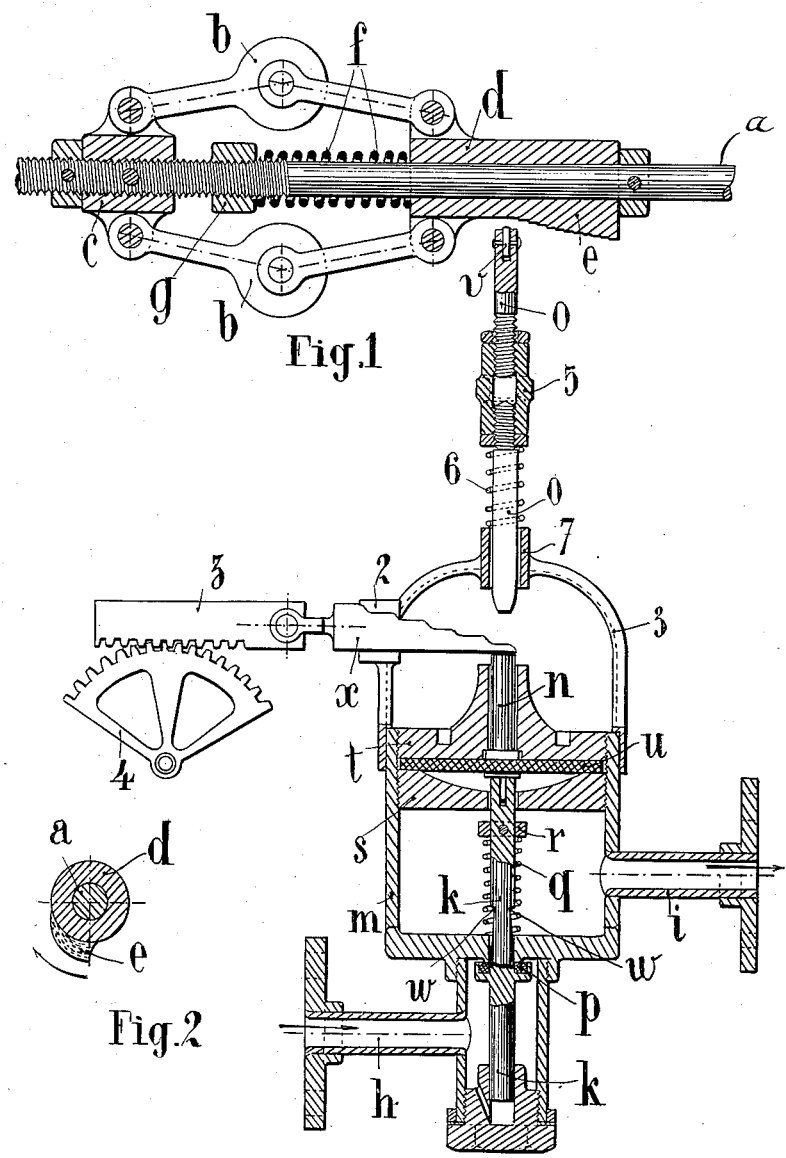

UNITED STATES PATENT OFFICE.

OLIVIER EMILE LEVILLY, OF PARIS, FRANCE.

EXPANSION-REGULATOR FOR REFRIGERATING-MACHINES.

No. 879,393.  Specification of Letters Patent.  Patented Feb. 18, 1908.

Application filed February 5, 1907. Serial No. 355,949.

*To all whom it may concern:*

Be it known that I, OLIVIER EMILE LE-VILLY, a citizen of the French Republic, and resident of Paris, France, have invented certain new and useful Improvements in Expansion-Regulators for Refrigerating-Machines, of which the following is a specification.

The present invention relates to refrigerating machines in which the cold is obtained through vaporization or through the expansion of a liquefied gas such as carbonic acid, ammonia etc.

It is evident that when the compressor destined to form the cycle through the reliquefication of the evaporated gas works with absolute regularity nothing is more simple than to regulate once for all the supply of liquefied gas in such a manner that it exactly corresponds with the suction of the compressor, which in its turn will be regulated according to the degree of cold to be obtained. With the plants in refrigerating wagons however, where the compressor is operated from the axle of the car, an apparatus has to be provided which maintains the supply of liquefied gas automatically in proportion with the speed of the compressor and further with the degree of cold to be produced for maintaining a constant temperature in the wagon; because, when the cold should become too strong the liquefied gas would not evaporate quickly enough in the expander and liquid would be drawn into the compressor.

The means hitherto proposed (mechanical speed regulators for the compressor, special driving pulleys etc.) have not yet practically removed the said difficulty. The object of the present invention is an absolutely automatically acting device for regulating the supply of liquefied gas to the expander according to the speed of the compressor and to the temperature of the refrigerating chamber, which device automatically shuts off the supply as soon as the normal temperature is obtained in the wagon.

A regulator constructed according to the present invention is shown by way of example in the accompanying drawing, in which Figure 1 represents the complete device in section. Fig. 2 is an end view of the driving shaft.

The driving shaft $a$ of the apparatus is connected with the compressor-shaft in such a manner that it revolves with the same. A centrifugal governor $b$ is mounted upon the driving shaft, the fixed end of the governor consisting of the sleeve $c$ and the movable end of the same consisting of sleeve $d$; this latter sleeve is provided with a stepped cam $e$ (Fig. 2) which has been obtained through juxtaposition of a certain number of similar cams the eccentricity of which gradually increases with their distance from the balls $b$. A spring $f$ inclosed between the sleeve $d$ and a regulating screw $g$ permits to adjust the effective working of regulator $b$ in such a manner that it corresponds with a predetermined speed of shaft $a$.

$h$ represents the coupling which connects the apparatus with the reservoir for the liquefied gas and $i$ represents the coupling which connects the apparatus with the expansion-radiator. The object to be attained is to regulate the supply of liquefied gas, which passes through coupling $i$ in proportion with the speed of the compressor and with the temperature of the refrigerating chamber. With this object in view a movable recessed rod, which on the one hand is operated from the regulator and on the other hand through a thermometer of suitable construction, is substituted for the pointed screw usually arranged between the coupling $h$ and $i$. This rod is composed of three parts, one of which, $k$, is situated in the apparatus in contact with the liquefied gas and it is destined to regulate through its displacements the variations of the opening for the passage of the gas, which is made in the bottom of chamber $m$;—the middle part, $n$, serves for transmitting the regulating action of the thermometer, and the third part, $o$, of the rod serves for connecting the two first parts with the stepped cam $e$.

The part $k$ of the rod is exposed to the pressure of the liquefied gas which forces it upwards and assures the complete obturation of the opening by means of the elastic washer $p$ as long as there is no pressure exerted upon said rod in opposite direction. This obturation is secured through spring $q$ which acts upon the abutment $r$ of rod $k$.

The tightness of chamber $m$ is secured through two screw-stoppers $s$ & $t$ which securely fix between them an elastic washer $u$. Rod $o$ terminates at its upper end in a roller $v$ which bears against the sleeve $d$ in such a manner that at each revolution of shaft $a$ one of the steps of cam $e$ presses upon said roller and makes the same descend. This motion is transmitted to rod $k$ through rod $n$ and effects the opening of the passage in the bottom of chamber $m$; each action of cam $e$ will therefore cause a motion of rod $k$ whereby communication between the coupling $h$ & $i$ is effected. This rod $k$ has at the part which moves in the passage or channel in the bottom of chamber $m$, two wedge-shaped incisions $w$ which are very narrow at the lower end where the washer $p$ is provided but get larger towards the upper end. It is easy to understand that the quicker the compressor runs, the centrifugal governor $b$ will pull the sleeve $d$ farther to the left and consequently the motion communicated to rod $k$ will become greater the farther the sleeve is moved to the left, wherefrom follows that at each revolution of the shaft $a$ the passage for the liquefied gas will become larger and will be kept open longer whereby the problem is effectually solved.

For regulating the section of the passage for the gas at the same time corresponding to the temperature of the refrigerating chamber, there is arranged between the parts $n$ and $o$ of the rod a stepped slide $x$ which is hinged to a rack $z$ and adapted to be displaced between two lateral guides 2 fixed to a yoke 3 of the chamber $m$. The rack $z$ is moved through a sector 4 which is operated in the well known manner through a thermometer of suitable construction. The device is arranged in such a manner that when a larger quantity of liquefied gas has to be supplied to the radiator the part of the slide which is placed between the parts $o$ and $n$ of the rod becomes the thicker.

To facilitate the regulation of the displacements of rod $o$, $k$ the part $o$ is composed of two parts which are connected through a double-threaded sleeve 5 for modifying the length of said rod; a spring 6 serves for securing the contact between roller $v$ and sleeve $d$. The yoke 3 serves further as support for guide 7 of rod $o$.

What I claim as my invention and desire to secure by Letters Patent, is:—

An expansion regulator for refrigerating machines comprising in combination a valve-rod provided with side inclined recesses made in three separate parts, the driving shaft for the device which is influenced from the compressor, a centrifugal governor on the driving shaft comprising a movable sleeve having a stepped cam formed thereon, adapted to act upon the upper part of the valve-rod; a stepped slide inserted between the upper part and the middle part of the valve-rod, a device influenced through the thermometer of the cooling room connected with the stepped slide for displacing the same in horizontal direction; and a spiral spring around the lower part of the valve-rod for keeping said part in the position in which it closes the passage for the liquefied gas, substantially as described and shown and for the purpose set forth.

In testimony whereof I have hereunto set my hand in presence of two subscribing witnesses.

OLIVIER EMILE LEVILLY.

Witnesses:
HANSON C. COXE,
ALFRED FREY.